United States Patent
Kim et al.

(10) Patent No.: US 11,727,405 B2
(45) Date of Patent: Aug. 15, 2023

(54) MULTI-CARD INCLUDING FINGERPRINT INPUT UNIT AND PAYMENT METHOD USING THE SAME

(71) Applicant: KONA I CO., LTD., Seoul (KR)

(72) Inventors: Ji Yeong Kim, Seoul (KR); Dae Beom Sim, Seoul (KR); Su Young Ki, Seoul (KR)

(73) Assignee: KONA I CO., LTD., Seoul (KR)

(*) Notice: Subject to any disclaimer, the term of this patent is extended or adjusted under 35 U.S.C. 154(b) by 0 days.

(21) Appl. No.: 17/409,412

(22) Filed: Aug. 23, 2021

(65) Prior Publication Data
US 2022/0076267 A1     Mar. 10, 2022

(30) Foreign Application Priority Data

Sep. 10, 2020  (KR) .................. 10-2020-0115829

(51) Int. Cl.
*G06Q 20/40*       (2012.01)
*G06Q 20/34*       (2012.01)

(52) U.S. Cl.
CPC ... *G06Q 20/40145* (2013.01); *G06Q 20/3574* (2013.01)

(58) Field of Classification Search
CPC ............ G06Q 20/40145; G06Q 20/3574
See application file for complete search history.

(56) References Cited

U.S. PATENT DOCUMENTS

| | | | | |
|---|---|---|---|---|
| 9,691,012 | B2* | 6/2017 | Hammad | G06Q 20/38215 |
| 9,935,961 | B2* | 4/2018 | Castinado | H04L 63/102 |
| 10,127,488 | B2* | 11/2018 | Amarnath | G06K 7/087 |
| 10,438,191 | B2* | 10/2019 | Zarakas | G06Q 20/354 |
| 10,482,453 | B2* | 11/2019 | Zarakas | G06Q 20/321 |
| 10,496,983 | B2* | 12/2019 | Zand | G06Q 20/352 |
| 10,701,560 | B1 | 6/2020 | Lerner et al. | |
| 10,754,834 | B1* | 8/2020 | Patil | G06F 16/215 |
| 10,867,231 | B2* | 12/2020 | Zand | G06K 19/0723 |
| 2002/0145050 | A1* | 10/2002 | Jayaratne | G06Q 20/40145 235/492 |
| 2004/0195314 | A1* | 10/2004 | Lee | G07C 9/257 235/380 |

(Continued)

FOREIGN PATENT DOCUMENTS

JP      2018-508091 A    3/2018
KR   10-2010-0024195 A    3/2010

(Continued)

*Primary Examiner* — Mike Anderson
*Assistant Examiner* — Paul R Kloberg
(74) *Attorney, Agent, or Firm* — Bridgeway IP Law Group, PLLC; Sang Ho Lee; Hyun Woo Shin (57) ABSTRACT

Provided is a multi-card having a fingerprint input unit and a payment method using the same, and the multi-card includes a secure element adapted to allow multiple pieces of card information issued to the same card service to match each of a plurality of fingerprints to thus store the matching results therein and a fingerprint input unit for receiving the plurality of fingerprints inputted thereto, wherein the secure element produces transaction response information having one piece of card information activated according to the fingerprint information inputted to the fingerprint input unit.

9 Claims, 3 Drawing Sheets

(56) References Cited

U.S. PATENT DOCUMENTS

| | | | | |
|---|---|---|---|---|
| 2005/0169503 | A1* | 8/2005 | Howell | G06F 3/011 |
| | | | | 340/5.83 |
| 2006/0229988 | A1* | 10/2006 | Oshima | G06Q 20/40145 |
| | | | | 705/50 |
| 2007/0214093 | A1* | 9/2007 | Colella | G07C 9/257 |
| | | | | 705/67 |
| 2007/0288472 | A1* | 12/2007 | Rivera | G06Q 20/20 |
| 2008/0120509 | A1 | 5/2008 | Simon | |
| 2009/0300733 | A1* | 12/2009 | Inomata | G06F 21/31 |
| | | | | 726/5 |
| 2009/0309701 | A1* | 12/2009 | Peled | G06Q 20/4014 |
| | | | | 340/5.83 |
| 2012/0168500 | A1* | 7/2012 | Li | G07F 7/0846 |
| | | | | 235/382 |
| 2014/0122340 | A1* | 5/2014 | Flitcroft | G06Q 20/16 |
| | | | | 705/44 |
| 2014/0263626 | A1* | 9/2014 | Pochic | G06K 19/06112 |
| | | | | 235/492 |
| 2015/0073983 | A1* | 3/2015 | Bartenstein | G06Q 20/325 |
| | | | | 705/41 |
| 2016/0104161 | A1* | 4/2016 | Butler | G07F 7/0846 |
| | | | | 705/44 |
| 2016/0217455 | A1* | 7/2016 | Hosny | G06Q 20/4012 |
| 2016/0307190 | A1* | 10/2016 | Zarakas | G06Q 20/321 |
| 2017/0330173 | A1* | 11/2017 | Woo | G06Q 20/341 |
| 2018/0005227 | A1* | 1/2018 | Sandeløv | G06Q 20/20 |
| 2018/0190060 | A1* | 7/2018 | Wurmfeld | G06K 19/07724 |
| 2019/0244210 | A1* | 8/2019 | Cheng | G06K 19/07705 |
| 2019/0392453 | A1* | 12/2019 | Agrawal | G06Q 20/341 |
| 2020/0005304 | A1* | 1/2020 | Almers | G06Q 20/40145 |
| 2020/0027077 | A1* | 1/2020 | Zarakas | G06K 19/0704 |
| 2021/0326824 | A1* | 10/2021 | Bartholomew | G07F 7/0846 |

FOREIGN PATENT DOCUMENTS

| | | |
|---|---|---|
| KR | 10-2019-0010753 A | 1/2019 |
| KR | 10-2019-0033899 A | 4/2019 |
| KR | 10-2090941 B1 | 3/2020 |

\* cited by examiner

List 1 (AID : A0 00 00 00 01)

| Fingerprint Nos. | Internal AID |
|---|---|
| 01 | A0 00 00 00 01 01 |
| 02 | A0 00 00 00 01 02 |
| 03 | A0 00 00 00 01 03 |

List 2 (AID : A0 11 11 11 11)

| Fingerprint Nos. | Internal AID |
|---|---|
|  | A0 11 11 11 11 01 |

MULTI-CARD INCLUDING FINGERPRINT INPUT UNIT AND PAYMENT METHOD USING THE SAME

BACKGROUND OF THE INVENTION

Field of the Invention

The present invention relates to a multi-card having a fingerprint input unit and a payment method using the same, and more particularly, to a multi-card having a fingerprint input unit and a payment method using the same that are capable of issuing a plurality of cards having the same card service like one another to a single card.

Background of the Related Art

Recently, various payment means such as mobile payments using mobile terminals have been developed, but basic payments using physical cards such as plastic cards have been still more preferred than mobile payments.

However, a plurality of plastic cards has to be issued to use various cards with the same brand (for example, Mastercard, Visa, local currency, and the like). Further, payments are made with different plastic cards according to franchise locations or the benefits of the cards, thereby causing all of the plastic cards available to be carried around inconveniently. To use local currency in several districts, for example, the plastic cards by district have to be issued to the user, and accordingly, they are carried around inconveniently.

Besides, the payments using plastic cards are approved without any separate security system, and if the plastic cards are lost, accordingly, they may be unfairly used.

To solve the above-mentioned problems, a multi-card including one or more pieces of card information in a single card is provided to use a plurality of card services with the single card. In this case, the card services may include payment services (for example, Mastercard, Visa, local currency, and the like) or membership services. However, a plurality of cards providing the same card service as one another cannot be issued to the existing multi-card, which has a problem in that the cards with the same kinds of card services cannot be issued in duplicate.

Accordingly, there is a need to develop a technology in which security is improved and multiple pieces of card information with the same card service are issued to a single card, so that the card desired by a user can be selected with only the single card so as to provide a payment service.

SUMMARY OF THE INVENTION

Accordingly, the present invention has been made to solve the above-mentioned problems, and it is an object of the present invention to provide a multi-card having a fingerprint input unit and a payment method using the same that are capable of issuing a plurality of cards having the same card service like one another to a single card, thereby removing inconveniences caused by possessing the plurality of cards having the same card service in a user's body.

To accomplish the above-mentioned objects, according to one aspect of the present invention, there is provided a multi-card including: a secure element adapted to allow multiple pieces of card information issued to the same card service to match each of a plurality of fingerprints to thus store the matching results therein and a fingerprint input unit for receiving the plurality of fingerprints inputted thereto, wherein the secure element produces transaction response information having one piece of card information activated according to the fingerprint information inputted to the fingerprint input unit.

The card service may include at least one of payment service and a membership service.

The secure element serves to allow the multiple pieces of card information by card service to match each of the plurality of the fingerprints, to store the matching results therein, to verify the fingerprint information inputted to the fingerprint input unit, to activate one piece of card information that corresponds to the card service selected from a payment terminal and matches the fingerprint information inputted, and to produce the transaction response information having one piece of card information activated.

The multi-card further may include: a control unit for controlling all of the operations of the secure element and the fingerprint input unit; and a display unit for displaying at least one of the card services selected from the payment terminal, the card information issued to the card service selected, one piece of card information activated by the fingerprint information inputted to the fingerprint input unit, a fingerprint verification state, and payment proceeding state.

The secure element produces at least one or more lists containing the card information having the same application identifier (AID) as one another, applies different internal AIDs to the card information having the same AID contained in the respective lists, allows the card information contained in the respective lists to match each of the plurality of fingerprints, and stores the matching results.

The secure element adds random characters to the AID or applies internal AIDs made by partially changing the AID in the card information having the same AID contained in the respective lists.

The matching results are set or changeable by allowing the card information to match the fingerprints through a service application driven by a user terminal.

To accomplish the above-mentioned objects, according to another aspect of the present invention, there is provided a payment method using a multi-card with a fingerprint input unit, the payment method comprising: verifying the fingerprint information inputted to the fingerprint input unit; activating one piece of card information that matches the fingerprint information inputted, based on the information stored by allowing multiple pieces of card information issued to the same card service as one another to match each of a plurality of fingerprints; and producing transaction response information with one piece of card information activated and transmitting the transaction response information to a payment terminal.

The activating one piece of card information that matches the fingerprint information inputted is carried out by activating one piece of card information that corresponds to the card service selected from the payment terminal and matches the fingerprint information inputted, based on the information stored by allowing the card information by card service to match the fingerprints.

The activating one piece of card information that matches the fingerprint information inputted is carried out by activating, when the number of card information issued to the card service selected is one if the fingerprint information inputted is verified as the fingerprint of the user, the corresponding card information.

The payment method further may comprising displaying at least one of the card services selected from the payment terminal, the card information issued to the card service selected, one piece of card information activated by the fingerprint information inputted to the fingerprint input unit, a fingerprint verification state, and payment proceeding state on a display unit.

The payment method further may comprising receiving, in the case where the card service of one piece of card information activated is local currency, a payment rejection response if the district where the franchise location using the payment terminal is placed does not correspond to the district where one piece of card information activated is used.

DETAILED DESCRIPTION OF THE PREFERRED EMBODIMENTS

Hereinafter, embodiments of the present invention will be described with reference to the accompanying drawings so as to clearly understand the technical spirit and scope of the present invention. Also, in explaining the example embodiments, detailed description on known elements or functions will be omitted if it is determined that such description will interfere with understanding of the embodiments. For reference numerals, with respect to the same elements, even though they may be displayed in different drawings, such elements use the same reference numerals as much as possible.

Figure 1:
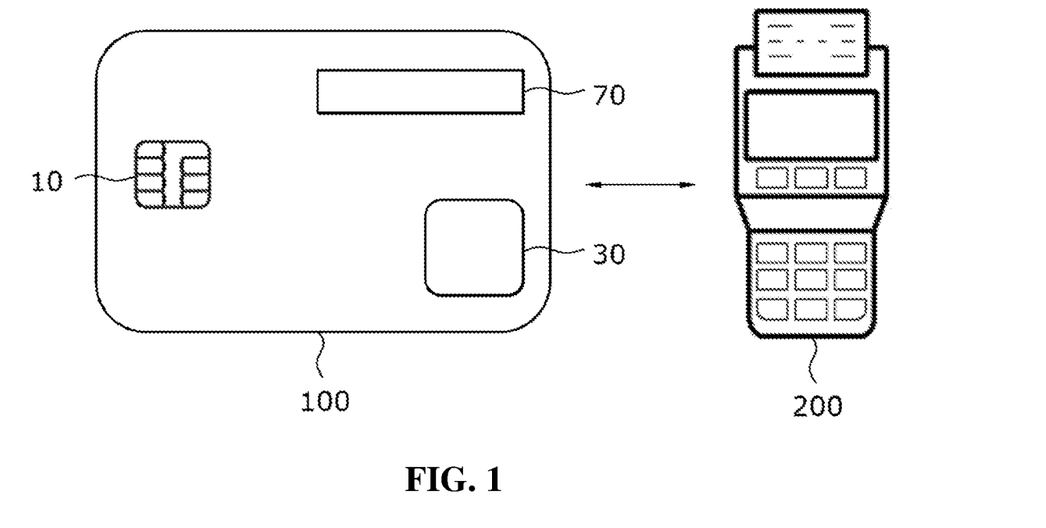
FIG. 1 is a schematic diagram showing a payment system using a multi-card according to the present invention.

FIG. 1 is a schematic diagram showing a payment system using a multi-card according to the present invention.

Referring to FIG. 1, a payment system using a multi-card according to the present invention includes a multi-card 100 and a payment terminal 200. According to the present invention, further, the payment system may include a user terminal.

The multi-card 100 is a plate-like physical card that has an IC chip 10 adapted to store card information for a plurality of payment means so as to use a plurality of card services. In this case, the card services include payment services (Mastercard, Visa, UnionPay, local currency, etc.) or memberships for point savings and discounts. That is, the multi-card 100 can store the card information required for the payment means or various membership card information issued by a variety of card companies in the IC chip 10. In this case, the card information is stored in the form of applets in the IC chip 10.

According to an embodiment of the present invention, the multi-card 100 can be accessed to a user terminal through wired/wireless communication, and through the service application executed in the user terminal, the card information matches the user's fingerprint so that setting and changing can be performed. For example, the user can set multiple pieces of card information to be connected to each of a plurality of fingerprints for the user cards accessed through the service application of the user terminal, and after the setting, the user can transmit the setting information to the multi-card 100.

According to an embodiment of the present invention, the multi-card 100 has the applets corresponding to the card information when issued, and the multi-card 100 can store one or more applets. For example, if a Visa card is issued as a multi-card 100, the multi-card 100 can have only the Visa card applets, and if Visa and Mastercard cards are issued, at least one piece of card information issued by the Visa and Mastercard cards matches at least one fingerprint and the matching result is stored in the multi-card 100. Also, multiple pieces of card information issued to the same card service as one another match each of a plurality of fingerprints and the matching results are stored. The card information may be fixed or changed by the user.

Further, the multi-card 100 can communicate with an external terminal through contact or non-contact. In specific, the IC chip 10 communicates with a card reader through contact or supplies and receives power to and from the card reader, and otherwise, the IC chip 10 operates through contactless from the power generated by receiving a wireless signal through an antenna. In addition to the IC chip 10 as a secure element, the multi-card 100 according to the present invention includes a fingerprint sensor 30 for receiving fingerprints, a display 70 for displaying card information or state information, a microcontroller unit (MCU), etc. The configuration and operation of the multi-card 100 will be explained in detail later with reference to FIG. 2.

The payment terminal 200 is acquired by a franchisee and includes various types of payment terminals containing an IC terminal capable of reading the multi-card 100, such as a Point-of-Sale (POS) system, a credit authorization terminal (CAT), a near-field communication (NFC) terminal, and the like.

According to an embodiment of the present invention, the payment terminal 200 may be provided as a separate terminal (an electronic device with an input unit and a display unit such as a scanner) or as different types of electronic devices implemented by software on the PC acquired in the franchised location or the staff mobile terminal. The payment terminal 200 may include a smart phone, a smart pad, a laptop, a digital broadcasting terminal, personal digital assistants (PDA), a portable multimedia player (PMP), navigation, a tablet PC, and various wearable devices such as a smart watch, a smart band, etc., which are acquired in the franchisee or staff.

According to an embodiment of the present invention, the payment terminal 200 can receive and process the card information upon payment. The payment terminal 200 receives transaction response information including the card information from the multi-card 100 and transmits the received information to a payment processing server.

The multi-card payment system according to the present invention can improve security through the multi-card having the fingerprint input unit and can have no need to issue a plurality of physical cards to the user so as to use various cards issued with the same card service (for example, Mastercard, Visa, UnionPay, local currency, membership, etc.) like one another.

Figure 2:
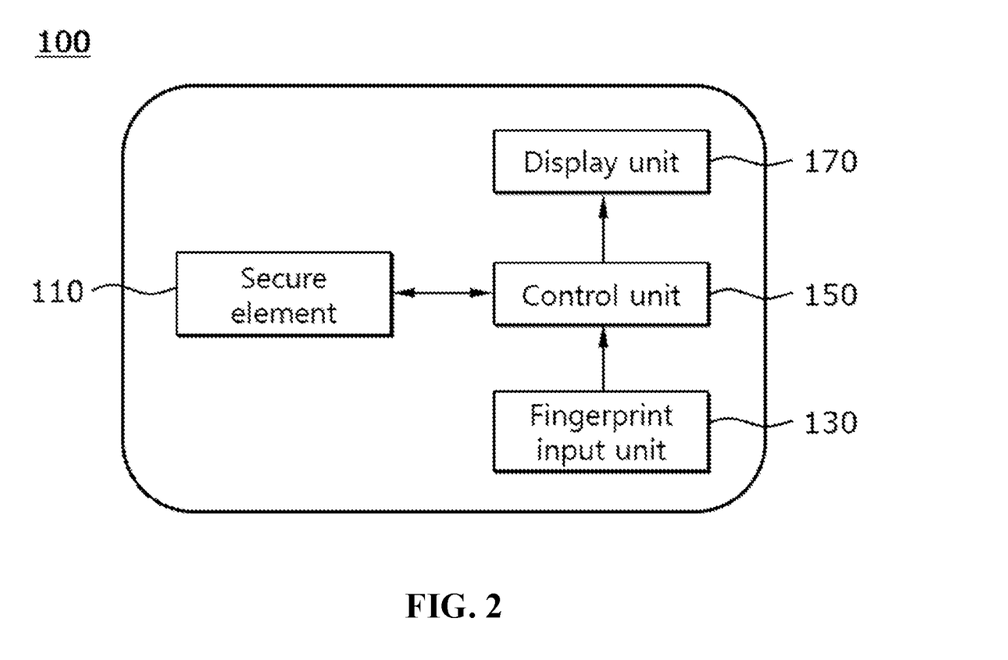
FIG. 2 is a block diagram showing components constituting a multi-card according to the present invention.

FIG. 2 is a block diagram showing components constituting the multi-card according to the present invention.

Referring to FIG. 2, a multi-card 100 according to the present invention includes a secure element 110, a fingerprint input unit 130, and a control unit 150, and even if not shown, it may include components for implementing the multi-card, such as an antenna, a battery, and the like, without being limited thereto. According to embodiments of the present invention, further, the multi-card 100 includes a display unit 170.

The secure element (SE) 110 may include a universal integrated circuit card (UICC), an embedded SE (eSE), and a micro secure digital (SD) card. The secure element 110 may be provided as the IC chip explained with reference to FIG. 1. The secure element 110 has a self-encryption system and is separated from the control unit 150 managing the operations of the multi-card 100, so that the secure element 110 is safe from hacking and ensures high security. Accordingly, the internal operations of the secure element 110 are performed by a control means provided in the secure element 110 itself.

The secure element 110 stores the card information for the payment means and a plurality of application programs associated with the card information. According to an embodiment of the present invention, the card information may be stored in the form of the applets executed in a Java-based platform. For example, the secure element 110 issues the card information (for example, brand name or card numbers) issued to Visa, Mastercard, UnionPay, and local currency to a card manager applet and allows the card information issued to the card manager applet to match the fingerprints received from the control unit 150.

The secure element 110 allows the card information by the card service to match the fingerprints and stores the matching results. In this case, the secure element 110 allows multiple pieces of card information issued to the same card service as one another to match each of a plurality of fingerprints and stores the matching results. In this case, the card service may include at least one Mastercard, Visa, UnionPay, local currency, and membership. An explanation of the information stored in the secure element 110 will be given in detail later with reference to FIG. 3.

The fingerprint input unit 130 is an input device for sensing the fingerprints inputted by the user and is provided as a form of a fingerprint sensor. If the fingerprint is inputted to the fingerprint input unit 130 by the user, the fingerprint information inputted is transmitted to the secure element 110 through the control unit 150. That is, the pre-matching fingerprint is inputted by the user so that his or her desired card information can be selected.

The secure element 110 produces transaction response information having one piece of card information activated according to the fingerprint information inputted to the fingerprint input unit 130. According to an embodiment of the present invention, the secure element 110 verifies the fingerprint information inputted to the fingerprint input unit 130, activates one piece of card information that corresponds to the card service selected from the payment terminal 200 and matches the fingerprint information inputted, and produces the transaction response information having one piece of card information activated.

In this case, the secure element 110 verifies the fingerprint information inputted to the fingerprint input unit 130, using pre-stored verification information for fingerprint verification. The secure element 110 determines whether the fingerprint information inputted to the fingerprint input unit 130 corresponds to pre-stored fingerprint verification information. Based on the fingerprint verification result, the secure element 110 activates one piece of card information that corresponds to the card service selected from the payment terminal 200 and matches the fingerprint information inputted. For example, the fingerprint verification result is produced by determining whether the fingerprint inputted to the fingerprint input unit 130 is normally acquired, whether the fingerprint information inputted corresponds to the pre-stored verification information, or the kind of fingerprint acquired.

The secure element 110 performs an IC card transaction using one piece of card information activated by the fingerprint inputted to the fingerprint input unit 130 among one or more pieces of card information stored in the multi-card 100. In this case, the other card information except the card information activated may not be activated. According to the present invention, further, the multi-card 100 transmits the payment card information (for example, credit card information) or membership card information to the payment terminal 200 through the secure element 110 during the IC card transaction. An explanation of the card transaction will be given in detail later with reference to FIG. 4.

The control unit 150 controls all of the operations of the respective components of the multi-card 100 and includes a micro controller unit (MCU) provided in the form of a printed circuit or chip disposed between an upper cover sheet and a lower cover sheet constituting the multi-card 100. In specific, the control unit 150 transmits the fingerprint information produced from the fingerprint inputted to the fingerprint input unit 130 to the secure element 110. Further, the control unit 150 displays the card information or state information on the display unit 170 according to the information received from the secure element 110 or the payment terminal 200.

According to an embodiment of the present invention, the multi-card 100 and the user terminal are wirelessly connected to each other by the user, and next, the card information by card service and the fingerprint match by the user through a service application. The control unit 150 receives the card information and the matching information from the user terminal and stores the received information in the secure element 110.

The display unit 170 serves to display the card information or state information (fingerprint verification state, payment response, and the like) and includes a black and white or color liquid crystal display (LCD), a black and white or color light-emitting display (LED), and a black and white or color electronic paper display (EPD) as components for visually displaying information.

According to an embodiment of the present invention, the display unit 170 displays at least one of the card services selected from the payment terminal 200, the card information issued to the card service selected, one piece of card information activated by the fingerprint information inputted to the fingerprint input unit 130, the fingerprint verification state, and the payment proceeding state. For example, the service selected through the payment terminal 200 by the franchisee is displayed on the display unit 170 so that the card information by card service is checked by the user. Accordingly, the multi-card 100 includes the display unit 170 for providing the feedback for the payment operation to the user.

Figure 3:
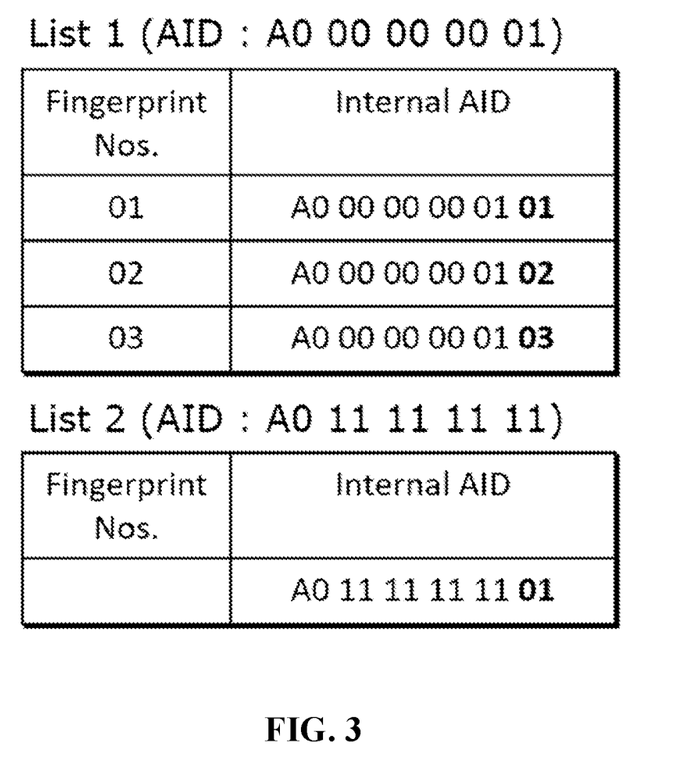
FIG. 3 is a diagram showing a secure element of the components constituting the multi-card according to the present invention.

FIG. 3 is a diagram showing the information stored in the secure element of the components constituting the multi-card according to the present invention.

First, the fingerprint information of a plurality of fingers of the user is stored in the secure element 110. The fingerprint information includes the fingerprint characteristics of the respective fingers and the fingerprint numbers applied to the respective fingers. For example, the user's right-hand thumb fingerprint is stored in the fingerprint number 01, and the index finger fingerprint in the fingerprint number 02, and the middle finger fingerprint in the fingerprint number 03.

Accordingly, the secure element 110 determines whether the information sensed by the fingerprint input unit 130 corresponds to which finger's fingerprint and thus extracts the fingerprint number corresponding to the fingerprint. For example, the secure element 110 determines whether the information sensed by the fingerprint input unit 130 corresponds to his or her thumb or index finger fingerprint according to the fingerprint characteristics and thus extracts the fingerprint number corresponding to the determined fingerprint.

Further, the secure element 110 stores the card information on the payment means and a plurality of application programs associated with the card information. According to an embodiment of the present invention, the secure element 110 stores the card information in the form of the applets executed in a Java-based platform.

The existing multi-card stores the application programs by card service (Visa, Mastercard, UnionPay, local currency, membership, etc.) in a single card and has inherent application identifiers (AIDs) corresponding to the names of the application programs. For example, the secure element 110 stores the application programs provided by card issuance companies, such as a Visa card application program, a Mastercard card application program, a UnionPay card application program, and the like. In the case of a plurality of cards having the same card service as one another, the AIDs are provided in duplicate, and accordingly, the plurality of cards have to be issued.

Because the AIDs are provided in duplicate in the applets, the cards having the same card service like one another cannot be distinguished with their AID, and accordingly, there is a limitation in allowing a plurality of cards having the same card service like one another to be issued to a single card.

Accordingly, the multi-card according to the present invention solves the limitation the existing multi-card has had by applying different internal AIDs to the card information issued to the same card service to thus store the card information, thereby allowing a plurality of cards by the same card service to be issued thereto. In the case of storing the card information issued to the same card service, the internal AIDs can be arranged on lists.

According to an embodiment of the present invention, the secure element 110 produces at least one or more lists containing the card information having the same AID as one another, applies different internal AIDs to the card information having the same AID contained in the respective lists, allows the card information contained in the respective lists to match each of the plurality of fingerprints, and stores the matching results.

In specific, the secure element 110 produces at least one or more lists containing the card information having the same AID as one another, and adds random characters to the AIDs or applies internal AIDs made by partially changing the AIDs in the card information having the same AID contained in the respective lists, so that the card information can be identified from one another. Without being limited thereto, the internal AIDs of the card information may be regularly applied according to the issuance order.

According to an embodiment of the present invention, the secure element 110 may apply the internal AIDs to the corresponding cards by adding the fingerprint numbers stored therein to the AIDs of the card services. For example, if the AID of the card service that will be stored in the secure element 110 is A0 00 00 00 01 and the fingerprint number is 01, the secure element 110 adds the fingerprint number to the AID of the corresponding card at the end position of the AID, so that the internal AID of A0 00 00 00 01 01 is applied and stored.

Referring to FIG. 3, List 1 includes three pieces of card information having AID of A0 00 00 00 01, and List 2 includes one piece of card information having AID of A0 11 11 11 11. In this case, the three pieces of card information included in List 1 are identified from one another by applying the internal AIDs made by adding arbitrary characters (for example, fingerprint numbers) to the end of the AID.

For example, it is assumed that the AID of Visa is A0 00 00 00 01 and the AID of Mastercard is A0 11 11 11 11, and if Mastercard is selected by the payment terminal 200, only one card is included in the Mastercard, so that if only the fingerprint verification is performed irrespective of the fingerprint number, the corresponding card is selected and the payment is carried out with the card selected. Contrarily, if Visa is selected by the payment terminal 200, three cards are included in the Visa, so that one card among the three Visa cards is selected according to the fingerprint number extracted from the fingerprint information inputted and the payment is carried out with the card selected.

Further, if it is assumed that the local currency is spent on both of Seo-gu in Incheon and Gangdong-gu in Seoul by the user, the services selected by the payment terminal 200 are the same as the local currency, but both of a Seo-gu Incheon local currency card and a Gangdong-gu Seoul local currency card have to be issued to the user and carried in him or her. According to the multi-card of the present invention, however, the Seo-gu Incheon local currency card and the Gangdong-gu Seoul local currency card are issued to one card and then match the fingerprint numbers. Next, if the corresponding fingerprint is inputted to the fingerprint input unit 130 so as to use the local currency at Seo-gu in Incheon, the payment can be carried out through the Seo-gu Incheon local currency. In the case where the fingerprint matches the fingerprint information inputted, however, the payment may be rejected from the payment processing server if the districts do not correspond to each other.

Figure 4:
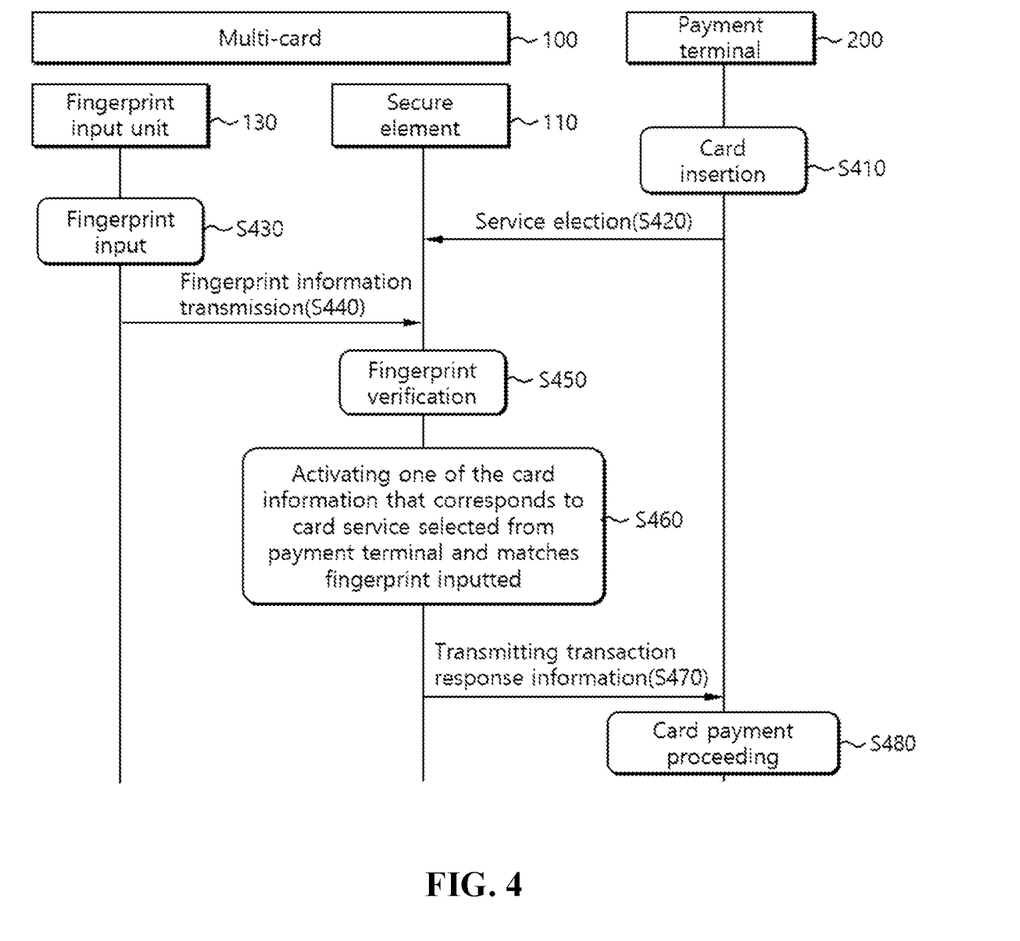
FIG. 4 is a flowchart showing a payment method using a multi-card according to the present invention.

FIG. 4 is a flowchart showing a payment method using the multi-card according to the present invention. The user inputs the fingerprint to the fingerprint input unit 130 of the multi-card 100 to select the payment card or membership card. According to the present invention, generally, the payment card such as a credit card, a check card, a gift card, a prepaid card, and the like will be explained, but without being limited thereto, a membership card for point saving or discounts may be applicable in the same manner as above.

Referring first to FIG. 4, the multi-card 100 is inserted into the payment terminal 200 by the user or payer (at step S410). In this case, the multi-card 100 is inserted into an IC terminal (slot) or magnetic stripe of the payment terminal 200 to perform the communication with the payment terminal 200, but without being limited thereto, of course, the multi-card 100 is wirelessly connected to the payment terminal 200 through near-field communication (NFC), Bluetooth low energy (BLE), and the like. According to an embodiment of the present invention, the payment terminal 200 displays the card service that can be used by the multi-card 100 and the payment terminal 200 on the display unit 170.

If the card service desired by the user is selected through the payment terminal 200 by the user or payer, the secure element 110 of the multi-card 100 receives the card service selected from the payment terminal 200 (at step S420). If no selection is carried out, the payment is performed with the card service selected before. In this case, the card service includes payment service such as Mastercard, Visa, UnionPay, and local currency or the membership service for point savings and discounts.

According to an embodiment of the present invention, the control unit 150 of the multi-card 100 allows the card information issued to the selected card service to be displayed on the display unit 170. This is to check the card information issued to the selected card service by the user, to input the corresponding fingerprint, to conduct the payment with his or her desired card, and to do this, the card information includes fingerprint numbers, brand names for identifying cards, logos, and the like. For example, if the service selected from the payment terminal 200 is the local currency, the control unit 150 allows the card information issued to the local currency and the fingerprint number that matches the card information to be displayed on the display unit 170. That is, for example, the card information "01 Seo-gu Incheon, 02 Gangdong-gu Seoul" is displayed on the display unit 170, and as a result, the user can check that the Seo-gu Incheon local currency matches the fingerprint number 01 and the Gangdong-gu Seoul local currency matches the fingerprint number 02.

The user inputs the fingerprint that matches the card to be used to the fingerprint input unit 130 (at step S430). For example, if the user desires to use the local currency card at Seo-gu in Incheon in a state where the Seo-gu Incheon local currency card matches the fingerprint number 01, the fingerprint (for example, the right-hand thumb fingerprint) corresponding to the fingerprint number 01 is inputted to select the Seo-gu Incheon local currency card.

If the secure element 110 receives the fingerprint information inputted to the fingerprint input unit 130 from the control unit 150 (at step S440), the secure element 110 verifies the fingerprint information inputted (at step S450). In specific, the secure element 110 determines whether the fingerprint information inputted corresponds to the pre-stored fingerprint information and extracts the fingerprint number corresponding to the fingerprint information inputted. In this case, if the fingerprint verification fails, the payment is not allowed.

The secure element 110 activates one piece of card information that matches the fingerprint information inputted, based on the information stored by allowing multiple pieces of card information issued to the same card service as one another to match each of a plurality of fingerprints. In specific, the secure element 110 activates one piece of card information that corresponds to the card service selected from the payment terminal 200 and matches the fingerprint information inputted to the fingerprint input unit 130, based on the card information by card service pre-stored in the multi-card 100 (at step S460). For example, one piece of card information, which corresponds to the card service selected from the payment terminal 200 and to the fingerprint number extracted from the fingerprint information inputted, can be activated.

According to an embodiment of the present invention, in the case where the number of card information issued to the card service selected from the payment terminal 200 is one, if the fingerprint information inputted is verified as the fingerprint of the user, the corresponding card information can be activated. For example, as shown in FIG. 3, in the case where one piece of card information included in the corresponding card service (List 2) has the internal AID of A0 11 11 11 11 01, if the fingerprint verification is just passed, irrespective of the fingerprint number extracted, the card information corresponding to the internal AID of A0 11 11 11 11 01 can be activated.

The secure element 110 produces the transaction response information having one piece of card information activated and transmits the produced transaction response information to the payment terminal 200 (at step S470). For example, in the case where Visa as the card service is selected and the fingerprint number 02 is extracted from the fingerprint information inputted, the secure element 110 activates only the card information that corresponds to Visa and matches the fingerprint number 02 and produces the transaction response information with only the card information corresponding to Visa and matching the fingerprint number 02. In this case, the remaining pieces of card information are kept in a non-activated state.

If the payment terminal 200 receives the transaction response information from the secure element 110 of the multi-card 100, the payment terminal 200 reads the card information included in the transaction response information (at step S480). In this case, the card information includes credit card information or membership card information. According to an embodiment of the present invention, the payment terminal 200 transmits a credit card transaction approval request to a credit card issuance company server or transmits a membership benefit service approval request to a membership card issuance company server according to the result read.

According to an embodiment of the present invention, in the case where the card service of one piece of card information activated is the local currency, if the district where the franchise location using the payment terminal 200 is placed does not correspond to the district where one piece of card information activated is used, the payment terminal 200 receives a payment rejection response. That is, in the case where the card service selected from the payment terminal 200 is the local currency, even if one piece of card information that matches the fingerprint after the fingerprint verification is activated to transmit the transaction response information, the payment request is rejected if the district where the franchise location using the payment terminal 200 is placed does not correspond to the district where one piece of card information activated is used. For example, in the case where the card service as the local currency is selected from the payment terminal 200 of the franchise location placed at Seo-gu in Incheon to perform the payment, if the fingerprint that matches the Gangdong-gu Seoul local currency is inputted by the user, the payment is rejected by the payment processing server.

According to an embodiment of the present invention, at least one of the card services selected from the payment terminal 200, the card information issued to the card service selected, one piece of card information activated by the fingerprint information inputted to the fingerprint input unit 130, the fingerprint verification state, and the payment proceeding state is displayed on the display unit 170.

According to the present invention, like this, the payment method makes use of the multi-card that allows the card information by the same card service to match each of the fingerprints, so that the fingerprint that matches the card desired for payment is inputted to thus select the desired card, thereby improving security and having no need to get a plurality of cards so as to use different cards with the same card service like one another.

In specific, in the case of the existing local currency using a prepaid card, the same payment application is used in every district. Accordingly, the AID of the application selected by the payment terminal 200 is the same in every district, but according to the information issued, the policy of the respective districts is distinguished.

The applications having the same AID as each other on one card do not exist, and even if the local currency in a plurality of districts is used, accordingly, the applications cannot be duplicated, so that a plurality of local currency cards have to be issued. Even though the duplication is possible, the payment terminal 200 cannot recognize whether which card is selected for the payment. Accordingly, if it is desired to use the local currency at given districts, the local currency cards by district have to be issued to the user and carried on him or her, thereby causing many inconveniences.

According to the present invention, the multi-card 100 is configured to allow the multiple pieces of card information issued to the same card service as one another to match a plurality of fingerprints and to allow the matching results to be stored therein, thereby making it possible to achieve the duplicated issuance of the same card service to a single card to thus optimize the user's conveniences.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. Terms used in this application are used to only describe specific exemplary embodiments and are not intended to restrict the scope of the present invention that is defined in the appended claims. In this application, steps may be differently carried out from the described order unless a specific order is described. That is, the steps may be carried out in parallel relation with one another, selectively, or individually. The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

What is claimed is:

1. A multi-card comprising:
    a secure element adapted to allow multiple pieces of card information issued to a same card service to match each of a plurality of fingerprints to store matching results therein; and
    a fingerprint sensor configured to receive the plurality of fingerprints inputted thereto, wherein the secure element is configured to:
    produce one or more lists for each card service based on an application identifier (AID);
    when there are the multiple pieces of card information having a same AID in each list, match the multiple pieces of card information with each of the plurality of fingerprints to generate an internal AID in which information on the plurality of fingerprints is further included in the multiple pieces of card information; and
    select a piece of card information corresponding to a fingerprint information input from the fingerprint sensor based on the internal AID to produce transaction response information,
    wherein the internal AID is generated by adding arbitrary characters to the AID or applying internal AIDs made by partially changing the AID in the card information having the same AID contained in the respective lists,
    wherein the security element is further configured to:
    upon a receipt of a selected card service from a payment terminal, retrieve the AID corresponding to the selected card service;
    when there are multiple internal AIDs corresponding to the selected card service, select card information that matches the fingerprint information;
    when there is only one internal AID corresponding to the selected card service, select card information that matches the AID retrieved, regardless of the internal AID, and
    wherein the matching results are set or changeable by allowing the card information to match the fingerprints through a service application driven by a user terminal.

2. The multi-card according to claim 1, wherein the card service comprises at least one of payment service and a membership service.

3. The multi-card according to claim 1, wherein the secure element serves to allow the multiple pieces of card information by card service to match each of the plurality of the fingerprints, to store the matching results therein, to verify the fingerprint information inputted to the fingerprint sensor, to select one piece of card information that corresponds to the card service selected from the payment terminal and matches the fingerprint information inputted, and to produce the transaction response information having one piece of card information selected.

4. The multi-card according to claim 3, further comprising:
    a control unit for controlling operations of the secure element and the fingerprint sensor; and
    a display unit for displaying at least one card service selected from the payment terminal, the card information issued to the card service selected, one piece of card information selected by the fingerprint information inputted to the fingerprint sensor, a fingerprint verification state, and a payment proceeding state.

5. An operation method of a multi-card having a secure integrated circuit (IC) chip and a fingerprint sensor, the operation method comprising:
    acquiring, by the fingerprint sensor, fingerprint information;
    verifying, by the secure IC chip, the fingerprint information inputted to the fingerprint sensor;
    selecting, by the secure IC chip, one piece of card information that matches the fingerprint information inputted, based on information stored by allowing multiple pieces of card information issued to a same card service as one another to match each of a plurality of fingerprints; and
    producing, by the secure IC chip, transaction response information with one piece of card information selected and transmitting the transaction response information to a payment terminal,
    wherein selecting the one piece of card information further comprises:
    producing, by the secure IC chip, one or more lists for each card service based on an application identifier (AID);
    when there are the multiple pieces of card information having a same AID in each list, matching, by the secure IC chip, the multiple pieces of card information with each of the plurality of fingerprints to generate an internal AID in which information on the plurality of fingerprints is further included in the multiple pieces of card information;
    selecting, by the secure IC chip, the one piece of card information corresponding to a fingerprint information input from the fingerprint sensor based on the internal AID to produce transaction response information; and
    displaying, by a display, a payment proceeding state, wherein the internal AID is generated by adding arbitrary characters to the AID or applying internal AIDs made by partially changing the AID in the card information having the same AID contained in the respective lists, wherein the security element is further configured to:

upon a receipt of a selected card service from a payment terminal, retrieve the AID corresponding to the selected card service;

when there are multiple internal AIDs corresponding to the selected card service, select card information that matches the fingerprint information;

when there is only one internal AID corresponding to the selected card service, select card information that matches the AID retrieved, regardless of the internal AID, and wherein the matching results are set or changeable by allowing the card information to match the fingerprints through a service application driven by a user terminal.

6. The operation method of the multi-card according to claim 5, wherein selecting, by the secure IC chip, the one piece of card information that matches the fingerprint information inputted is carried out by selecting one piece of card information that corresponds to the card service selected from the payment terminal and matches the fingerprint information inputted, based on the information stored by allowing the card information by card service to match the fingerprints.

7. The operation method of the multi-card according to claim 6, wherein selecting, by the secure IC chip, the one piece of card information that matches the fingerprint information inputted is carried out by selecting, when the number of card information issued to the card service selected is one, when the fingerprint information inputted is verified as a fingerprint of a user, the corresponding card information.

8. The operation method of the multi-card according to claim 6, further comprising displaying, by the display, at least one of the card services selected from the payment terminal, the card information issued to the card service selected, one piece of card information selected by the fingerprint information inputted to the fingerprint sensor, and a fingerprint verification state.

9. The operation method of the multi-card according to claim 5, further comprising receiving, by the secure IC chip, in a case where the card service of one piece of card information selected is local currency, a payment rejection response from the payment terminal when a district where a franchise location using the payment terminal is placed does not correspond to a district where one piece of card information selected is used.

\* \* \* \* \*